United States Patent
Iida et al.

(10) Patent No.: US 7,742,282 B2
(45) Date of Patent: Jun. 22, 2010

(54) SOLID ELECTROLYTIC CAPACITOR AND MANUFACTURING METHOD THEREOF

(75) Inventors: Takahisa Iida, Hirakata (JP); Mutsumi Yano, Hirakata (JP); Mamoru Kimoto, Hirakata (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 810 days.

(21) Appl. No.: 11/336,787

(22) Filed: Jan. 23, 2006

(65) Prior Publication Data

US 2006/0221549 A1 Oct. 5, 2006

(30) Foreign Application Priority Data

Mar. 29, 2005 (JP) .............................. 2005-096535

(51) Int. Cl.
*H01G 9/04* (2006.01)
*H01G 9/145* (2006.01)
*H01G 4/06* (2006.01)

(52) U.S. Cl. ........................ 361/528; 361/524; 29/25.03
(58) Field of Classification Search ................... 257/40; 361/523–528; 29/25.03, 62.22, 250.3; 252/622
See application file for complete search history.

(56) References Cited

U.S. PATENT DOCUMENTS

| | | | | |
|---|---|---|---|---|
| 4,684,697 | A * | 8/1987 | Chang et al. | 525/100 |
| 6,602,741 | B1 * | 8/2003 | Kudoh et al. | 438/141 |
| 6,771,488 | B2 * | 8/2004 | Takagi et al. | 361/523 |
| 7,144,432 | B2 * | 12/2006 | Nakamura | 29/25.03 |
| 2003/0099845 | A1 * | 5/2003 | Ogawa et al. | 428/447 |
| 2005/0128685 | A1 * | 6/2005 | Hasegawa | 361/525 |
| 2005/0219801 | A1 * | 10/2005 | Yano et al. | 361/523 |
| 2005/0219803 | A1 * | 10/2005 | Takatani et al. | 361/524 |
| 2006/0133014 | A1 * | 6/2006 | Yano et al. | 361/524 |
| 2006/0221554 | A1 * | 10/2006 | Takatani et al. | 361/525 |
| 2006/0268492 | A1 * | 11/2006 | Yano et al. | 361/272 |
| 2007/0206344 | A1 * | 9/2007 | Naito et al. | 361/523 |

FOREIGN PATENT DOCUMENTS

| | | |
|---|---|---|
| JP | 11-274009 A | 10/1999 |
| JP | 2001-217159 | 8/2001 |

OTHER PUBLICATIONS

Office Action issued Nov. 24, 2009 in corresponding Japanese Patent Application 2005-096535.

* cited by examiner

*Primary Examiner*—Zandra Smith
*Assistant Examiner*—Telly D Green
(74) *Attorney, Agent, or Firm*—Westerman, Hattori, Daniels & Adrian, LLP

(57) ABSTRACT

In this solid electrolytic capacitor, a plate-shaped anode having a porous sintered body, a dielectric layer and an electrolyte layer of polypyrrole are formed in this order for covering one part of an anode lead. An intermediate layer of aminopropyltriethoxysilane (APTES) is formed for covering the electrolyte layer. A cathode having a first conductive layer containing graphite particles and a second conductive layer containing silver particles is formed for covering the intermediate layer. The cathode and a cathode terminal are connected by a conductive adhesive layer. The anode lead and the anode terminal are connected by welding. Further, a mold outer resin is formed to allow one end of the cathode terminal and one end of the anode terminal to project therefrom.

14 Claims, 1 Drawing Sheet

SOLID ELECTROLYTIC CAPACITOR AND MANUFACTURING METHOD THEREOF

RELATED APPLICATION

The priority application number Japanese patent application No. 2005-96535 upon which this patent application is based is hereby incorporated by reference.

BACKGROUND OF THE INVENTION

1. Field of the Invention

The present invention relates to a solid electrolytic capacitor and a method of manufacturing the same.

2. Description of the Background Art

Recently, it has been desired to develop a solid electrolytic capacitor having a smaller value of equivalent serial resistance (hereinafter referred to as ESR) in a high frequency region. In the conventional solid electrolytic capacitor, a dielectric layer is formed on an anode made up of a valve metal such as tantalum for covering the anode by anodic oxidation. Then an electrolyte layer made up of manganese oxide or conductive polymer with low resistivity is formed on the dielectric layer. Further, a cathode having a two-layer structure of a first conductive layer containing carbon particles formed on the electrolyte layer and a second conductive layer containing silver particles formed on the first conductive layer is formed on the dielectric layer.

In order to reduce contact resistance between the dielectric layer and the cathode affecting ESR in a high frequency region, a solid electrolytic capacitor has been proposed which has an intermediate layer mixed with the dielectric layer and carbon particles formed between the aforementioned dielectric layer and the first conductive layer containing carbon particles, (see, for example, JP-2001-217159-A).

However, in the aforementioned conventional solid electrolytic capacitor having the intermediate layer mixed with the dielectric layer and carbon particles formed between the aforementioned dielectric layer and the first conductive layer containing carbon particles, there has remained a problem that an ESR sufficiently low is not obtained.

SUMMARY OF THE INVENTION

An object of the present invention is to provide a solid electrolytic capacitor with low equivalent serial resistance.

Another object of the present invention is to provide a method of manufacturing a solid electrolytic capacitor with low equivalent serial resistance.

According to a first aspect of the present invention, a solid electrolytic capacitor has an anode containing a metal, a dielectric layer containing an oxide of the metal formed on the anode and an electrolyte layer containing manganese oxide or conductive polymer formed on the dielectric layer. The capacitor also has a cathode having a first conductive layer containing carbon particles formed on the electrolyte layer. Further, an intermediate layer containing organic silane is formed between the electrolyte layer and the first conductive layer in the capacitor.

In the solid electrolytic capacitor according to the first aspect, the intermediate layer containing the organic silane is formed between the electrolyte layer containing manganese oxide or conductive polymer and the first conductive layer containing carbon particles as described above. According to this structure, organic silane has a good adhesion property to manganese oxide, conductive polymer and carbon. Thus, the adhesion property between the electrolyte layer and the first conductive layer is improved. Consequently, the contact resistance between the electrolyte layer and the cathode is reduced. Thus, the solid electrolytic capacitor with low ESR in a high frequency region is obtained.

In the solid electrolytic capacitor according to the first aspect, the intermediate layer preferably includes at least one kind of the organic silane selected from the group containing aminopropyltriethoxysilane (APTES), dimethoxydiphenylsilane (DMDPS) and mercaptopropyltrimethoxysilane (MPTMS). According to this structure, the adhesion property between the electrolyte layer and the cathode is further improved. Thus, the contact resistance between the electrolyte layer and the cathode is further reduced and the solid electrolytic capacitor with low ESR is further easily obtained.

In the solid electrolytic capacitor according to the first aspect, the intermediate layer preferably has a thickness of a monomolecular layer. According to this structure, the intermediate layer is formed uniformly having a small thickness between the electrolyte layer and the cathode. Then, the adhesion property is improved without increasing the resistance between the electrolyte layer and the cathode.

When the intermediate layer becomes thinner, the aforementioned effect of improving the adhesion property becomes smaller. When the intermediate layer becomes thicker, ESR becomes larger in the opposite direction depending upon the influence of the resistance of the intermediate layer. Thus, the thickness of the intermediate layer containing organic silane is preferably in the range of about 0.1 nm to about 2.0 nm.

In the solid electrolytic capacitor according to the first aspect, the intermediate layer may contain APTES. According to this structure, the adhesion property between the electrolyte layer and the cathode is further improved. Thus, the contact resistance between the electrolyte layer and the cathode is further reduced and a solid electrolytic capacitor with low ESR is further easily obtained.

In the solid electrolytic capacitor according to the first aspect, the intermediate layer may contain DMDPS. According to this structure, the adhesion property between the electrolyte layer and the cathode is further improved. Thus, the contact resistance between the electrolyte layer and the cathode is further reduced and a solid electrolytic capacitor with low ESR is further easily obtained.

In the solid electrolytic capacitor according to the first aspect, the intermediate layer may contain MPTMS. According to this structure, the adhesion property between the electrolyte layer and the cathode is further improved. Thus, the contact resistance between the electrolyte layer and the cathode is further reduced and a solid electrolytic capacitor with low ESR is further easily obtained.

Further, the valve metal such as tantalum, aluminum, niobium or titanium is preferably used as the metal to form the anode. According to this structure, the dielectric layer containing the oxide of the valve metal is easily obtained by anodically oxidizing the anode containing the valve metal.

In a method of manufacturing a solid electrolytic capacitor according to a second aspect of the present invention, a dielectric layer containing an oxide of a metal is formed on an anode containing the metal. Further an electrolyte layer containing manganese oxide or conductive polymer is formed on the dielectric layer. Then, an intermediate layer containing organic silane is formed on the electrolyte layer by immersing the electrolyte layer in an aqueous solution containing the organic silane. Further, a cathode having a first conductive layer containing carbon particles is formed on the electrolyte layer.

In the method of manufacturing the solid electrolytic capacitor according to the second aspect, the electrolyte layer containing manganese oxide or conductive polymer is immersed in the aqueous solution containing organic silane as described above. Thus, organic silane hydrolyzed in the aqueous solution is adhered on the surface of the electrolyte layer. Organic silane has a good adhesion property to manganese oxide and conductive polymer, so that the intermediate layer with a good adhesion property containing organic silane is formed on the surface of the electrolyte layer. In this case, the intermediate layer containing organic silane is formed uniformly on the surface of the electrolyte layer by immersing the electrolyte layer in the aqueous solution. Further, the electrolyte layer is immersed in the aqueous solution repeatedly, so that the thickness of the intermediate layer is controllable.

Further, organic silane also has a good adhesion property to carbon. Thus, the good adhesion property between the intermediate layer containing organic silane and the first conductive layer is obtained in the case of forming the first conductive layer containing carbon particles on the aforementioned intermediate layer. Consequently, the adhesion property between the electrolyte layer and the cathode including the first conductive layer is improved. Thus, the contact resistance between the electrolyte layer and the cathode is reduced and a solid electrolytic capacitor with low ESR in a high frequency region is easily obtained.

In the method of manufacturing the solid electrolytic capacitor according to the second aspect, the aqueous solution preferably includes at least one kind of the organic silane selected from the group containing aminopropyltriethoxysilane (APTES), dimethoxydiphenylsilane (DMDPS) and mercaptopropyltrimethoxysilane (MPTMS). According to this structure, the adhesion property between the electrolyte layer and the cathode is further improved. Thus, the contact resistance between the electrolyte layer and the cathode is further reduced and the solid electrolytic capacitor with low ESR is further easily obtained.

DETAILED DESCRIPTION OF THE INVENTION

Figure 1:
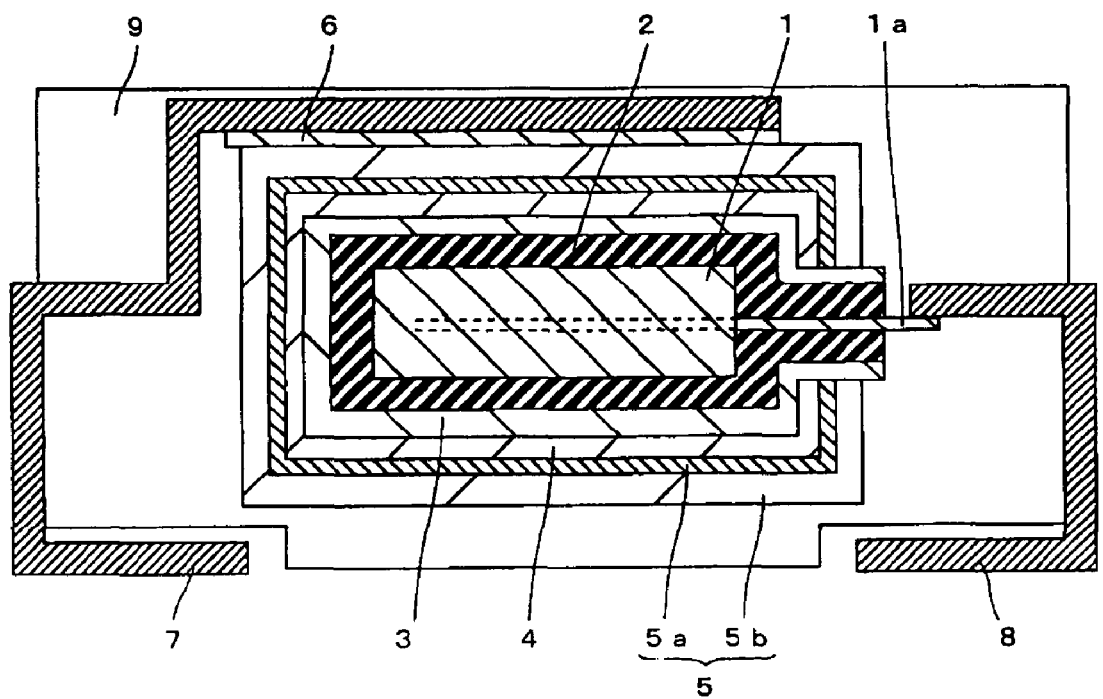
FIG. 1 is a sectional view showing a solid electrolytic capacitor according to example 1 of the present invention.

Examples of the present invention are now described with reference to the drawings.

Example 1

A structure of a solid electrolytic capacitor according to example 1 of the present invention is now described with reference to FIG. 1.

First, in the solid electrolytic capacitor according to example 1 of the present invention, a plate-shaped anode 1 is formed for covering the one part of an anode lead 1a of tantalum, as shown in FIG. 1. The anode 1 has a porous sintered body of tantalum prepared by sintering tantalum particles having an average particle diameter of about 2 μm in a vacuum. Tantalum is an example of the "metal" forming the anode in the present invention.

A dielectric layer 2 of tantalum oxide is formed for covering the anode 1. An electrolyte layer 3 of polypyrrole is formed for covering the dielectric layer 2.

An intermediate layer 4 of aminopropyltriethoxysilane (APTES) having a thickness of an approximately monomolecular layer (about 0.5 nm) is formed uniformly for covering the electrolyte layer 3. APTES is an example of "organic silane" in the present invention.

A cathode 5 is formed for covering the intermediate layer 4. The cathode 5 is formed by a first conductive layer 5a mainly containing graphite particles formed for covering the intermediate layer 4 and a second conductive layer 5b mainly containing silver particles formed for covering the first conductive layer 5a. The first conductive layer 5a and the second conductive layer 5b may include polyethyleneimine as a protective colloid. The "protective colloid" herein represents a hydrophilic colloid to be added in order to increase the stability of a hydrophobic colloid for the electrolyte (Rikagaku Jiten, 5th ed.: Iwanami, p. 1300). Graphite particles are an example of "carbon particles" in the present invention.

A conductive adhesive layer 6 is formed on the upper surface of the cathode 5, and the cathode 5 and a cathode terminal 7 are connected by the conductive adhesive layer 6. An anode terminal 8 is connected by welding the anode terminal 8 on the anode lead 1a projecting from the anode 1. Further, a mold outer resin 9 is formed around the second conductive layer 5b, the cathode terminal 7 and the anode terminal 8 to allow the one end of the cathode terminal 7 and that of the anode terminal 8 to project therefrom. Thus, a solid electrolytic capacitor according to example 1 of the present invention is formed.

A process of manufacturing a solid electrolytic capacitor according to example 1 of the present invention shown in FIG. 1 is described below.

First, tantalum particles having an average particle diameter of about 2 μm are molded in plate-shape for covering the one part of an anode lead 1a of tantalum. Then, an anode 1 is formed by sintering tantalum particles in a vacuum.

The anode 1 is anodized at the constant voltage of about 8 V in an aqueous solution of about 0.1 wt % phosphoric acid kept at about 60 degree C. for about 10 hours. Thus, a dielectric layer 2 of tantalum oxide is formed for covering the anode 1.

An electrolyte layer 3 of polypyrrole is formed on the dielectric layer 2 by chemical polymerization.

The anode 1 formed with the electrolyte layer 3 is then immersed in an aqueous solution of about 0.002 wt % APTES, so that APTES is adhered uniformly on the surface of the electrolyte layer 3. Thus, an intermediate layer 4 of APTES having the thickness of an approximately monomolecular layer (about 0.5 nm) is formed for covering the electrolyte layer 3.

Graphite paste containing graphite particles, polyethyleneimine as the protective colloid and ethanol as an organic solvent is applied on the intermediate layer 4 and then dried at about 80 degree C. for about 30 minutes. Thus, a first conductive layer 5a mainly containing graphite particles is formed. Silver paste containing silver particles, polyethyleneimine as the protective colloid and ethanol as the organic solvent is then applied for covering the first conductive layer 5a and is then dried at about 170 degree C. for about 30 minutes. Thus, a second conductive layer 5b mainly containing silver particles is formed and a cathode 5 laminated from the first conductive layer 5a and the second conductive layer 5b is formed for covering the intermediate layer 4.

After a conductive adhesive agent is applied on a cathode terminal 7, the cathode 5 and the cathode terminal 7 are joined by this conductive adhesive agent. The conductive adhesive agent is dried at about 60 degree C. for about 30 minutes under pressure between the cathode 5 and the cathode terminal 7. Thus, a conductive adhesive layer 6 connecting the cathode 5 and the cathode terminal 7 is formed.

After that, an anode terminal 8 is connected by welding the anode terminal 8 on the anode lead 1a and a mold outer resin 9 is formed to allow the one end of the cathode terminal 7 and that of the anode terminal 8 to project therefrom. Thus, a solid electrolytic capacitor according to example 1 of the present invention is fabricated.

Comparative Example 1

As the comparative example 1, a solid electrolytic capacitor having the same structure as that in example 1 is fabricated except that the intermediate layer 4 is not formed between the electrolyte layer 3 and the cathode 5 in the aforementioned example 1.

Comparative Example 2

As the comparative example 2, a solid electrolytic capacitor having the same structure as the conventional solid electrolytic capacitor is fabricated. In other words, the solid electrolytic capacitor having the same structure as that in example 1 is fabricated except that the intermediate layer of a mixture of carbon particles and polypyrrole is used instead of the intermediate layer 4 of APTES and the first conductive layer containing carbon particles is used instead of the first conductive layer 5a containing graphite particles.

In this comparative example, the intermediate layer of a mixture of carbon particles and polypyrrole and the first conductive layer are formed as follows.

The anode formed with the electrolyte layer is immersed in an aqueous solution of carbon particles having a diameter of about 10 nm to about 1 μm by about 60 g per liter for about 3 minutes. Then, the anode is dried at about 120 degree C. for about 30 minutes, so that carbon particles are dispersed on the electrolyte layer. After that, polypyrrole is formed by chemical polymerization on the electrolyte layer on which carbon particles are dispersing. Thus, the intermediate layer of a mixture of carbon particles and polypyrrole is formed.

The anode formed with the aforementioned intermediate layer is immersed in an aqueous solution of carbon particles having a diameter of about 10 nm to about 1 μm by about 120 g per liter for about 3 minutes. Then, the anode is dried at about 120 degree C. for about 30 minutes, so that the first conductive layer containing carbon particles is formed on the intermediate layer.

The solid electrolytic capacitors formed in example 1 and the comparative examples 1 to 2 are measured for ESR at a frequency of about 100 kHz using an LCR meter by means of applying voltage between the cathode terminal 7 and the anode terminal 8. The results are shown in Table 1. In the Table 1, the normalized values of the measurement results of example 1 and the comparative example 2 by a measurement result of the comparative example 1 as 100 are shown with measurement values.

TABLE 1

|  | Intermediate layer | ESR | |
| --- | --- | --- | --- |
| Example 1 | APTES | 15.9 mΩ | 86 |
| Comparative example 1 | Nothing | 18.4 mΩ | 100 |
| Comparative example 2 | Mixture of carbon particles and polypyrrole | 18.2 mΩ | 98 |

It is discovered that ESR in the solid electrolytic capacitor of example 1 is reduced as compared with ESR in the solid electrolytic capacitor of the comparative example 1 and 2, as shown in Table 1. ERS in the solid electrolytic capacitor of example 1 is reduced in spite of relatively high resistivity of APTES of about $10^4$ Ω·cm, because the intermediate layer 4 of APTES is conceivably formed approximately uniformly having a small thickness between the electrolyte layer 3 and the cathode 5. Thus, the adhesion property without increasing the resistance between the electrolyte layer 3 and the cathode 5 may be successfully improved.

Example 2

In example 2, solid electrolytic capacitors having the same structure as that in example 1 are fabricated except that an intermediate layer 4 of another organic silane is formed instead of the intermediate layer 4 of APTES in the aforementioned example 1.

In this example, the solid electrolytic capacitors are fabricated in the same manner as in example 1, except that aqueous solutions are formed of about 0.002 wt % of octadecyltriethoxysilane (OTES), n-propyltrichlorosilane (nPTCS), dimethoxydiphenylsilane (DMDPS), methylphenyidichlorosilane (MPDCS) and mercaptopropyltrimethoxysilane (MPTMS) respectively, instead of the aqueous solution containing about 0.002 wt % of APTES used in example 1. Thus, the solid electrolytic capacitors having the intermediate layer 4 of OTES, nPTCS, DMDPS, MPDCS and MPTMS with a thickness of an approximately monomolecular layer (about 0.1 nm to about 2.0 nm) disposed between the electrolyte layer 3 and the cathode 5 are fabricated respectively.

The solid electrolytic capacitors formed in example 2 are measured for ESR at a frequency of about 100 kHz using the LCR meter by means of applying voltage between the cathode terminal 7 and the anode terminal 8. The results are shown in Table 2. In the Table 2, the normalized values of the measurement results of example 2 by the measurement result of the comparative example 1 as 100 are shown.

TABLE 2

|  | Intermediate layer | ESR |
| --- | --- | --- |
| Example 2 | OTES | 92.9 |
|  | nPTCS | 90.3 |
|  | DMDPS | 87.7 |
|  | MPDCS | 90.3 |
|  | MPTMS | 87.7 |
| Example 1 | APTES | 86 |
| Comparative example 1 | nothing | 100 |
| Comparative example 2 | mixture of carbon particles and polypyrrole | 98 |

It becomes clear that ESR in the solid electrolytic capacitors of example 2 is reduced as compared with ESR in the solid electrolytic capacitor of the comparative examples 1 and 2 as shown in Table 2. Thus, the desirable intermediate layer 4 for reducing ESR may be made up of another organic silane instead of APTES in example 1. Particularly, it is discovered that DMDPS, MPTMS and APTES are preferable to reducing ESR as organic silane forming the intermediate layer 4.

In examples 1 and 2, the electrolyte layers 3 are immersed in aqueous solutions containing organic silane, so that organic silane hydrolyzed in the aqueous solutions is adhered approximately uniformly on the surface of the electrolyte layer. The electrolyte layer is immersed in the aforementioned aqueous solutions repeatedly, so that the thickness of the intermediate layer is controllable.

In examples 1 and 2, the anodes 1 made up of the porous sintered body are used. Thus, the contact area increases between the electrolyte layer 3 and the cathode 5 and minute rugged shape is formed on the electrolyte layer 3, so that the adhesion property between the electrolyte layer 3 and the cathode 5 is improved. Consequently, ESR is further reduced.

In examples 1 and 2, the anodes 1 made up of tantalum as the valve metal are used. Thus, the dielectric layer of tantalum oxide is easily obtained by anodically oxidizing this anode 1.

Although the present invention has been described and illustrated in detail, it is clearly understood that the same is by way of illustration and example only and is not to be taken by way of limitation, the spirit and scope of the present invention being limited only by the terms of the appended claims.

For example, while the intermediate layers 4 are made up of APTES, OTES, nPTCS, DMDPS, MPDCS and MPTMS respectively in each of the aforementioned examples, the present invention is not restricted to these but intermediate layer 4 may be made up of another methlsilane, phenylsilane, vinylsilane, alkyloxysilane, mercaptosilane, and aminosilane. Intermediate layer 4 may include at least one kind of organic silane selected from the group containing the aforementioned organic silane. Further, intermediate layer 4 may include a material other than these kinds of the organic silane.

While the intermediate layers 4 are formed by immersing the electrolyte layer 3 in an aqueous solution containing organic silane in each of the aforementioned examples, the present invention is not restricted to this but intermediate layer 4 may be formed by adhering organic silane on the surface of the electrolyte layer 3 by means of spraying or the like.

While the electrolyte layers 3 are made up of polypyrrole in each of the aforementioned examples, the present invention is not restricted to this but electrolyte layer 3 may contain another conductive polymer or manganese oxide.

While the first conductive layers 5a contain graphite particles in each of the aforementioned examples, the present invention is not restricted to this but first conductive layer 5a may contain other carbon particles than graphite particles.

While the anodes 1 are made up of tantalum in each of the aforementioned examples, the present invention is not restricted to this but anode 1 may be made up of another kind of a valve metal such as aluminum, niobium and titanium. Anode 1 may be made up of an alloy containing the valve metal.

While the aqueous solutions of phosphoric acid are used for anodic oxidation of the anode 1 in each of the aforementioned examples, the present invention is not restricted to this but aqueous solutions containing fluorine such as ammonium fluoride, potassium fluoride, sodium fluoride and fluoric acid, and phosphate solution may be used.

While the anodes 1 have a plate-shaped body in each of the aforementioned examples, the present invention is not restricted to this but anode 1 may have a sheet-shaped body or a foil-shaped body.

What is claimed is:

1. A solid electrolytic capacitor, comprising:
   an anode containing a metal;
   a dielectric layer containing an oxide of said metal formed on said anode;
   an electrolyte layer containing manganese oxide or conductive polymer formed on said dielectric layer;
   a cathode having a first conductive layer containing carbon particles formed on said electrolyte layer and a second conductive layer containing silver particles formed on said first conductive layer; and
   an intermediate layer of organic silane disposed between said electrolyte layer and said first conductive layer,
   wherein said intermediate layer, said first conductive layer and said second conductive layer are sequentially stacked in order on said electrolyte layer,
   said intermediate layer is thinner than said first conductive layer.

2. The solid electrolytic capacitor according to claim 1, wherein said intermediate layer includes at least one kind of said organic silane selected from the group consisting of aminopropyltriethoxysilane (APTES), dimethoxydiphenylsilane (DMDPS) and mercaptopropyltrimethoxysilane (MPTMS).

3. The solid electrolytic capacitor according to claim 2, wherein said intermediate layer has a thickness of a monomolecular layer.

4. The solid electrolytic capacitor according to claim 1, wherein said intermediate layer contains APTES.

5. The solid electrolytic capacitor according to claim 4, wherein said intermediate layer has a thickness of a monomolecular layer.

6. The solid electrolytic capacitor according to claim 1, wherein said intermediate layer contains DMDPS.

7. The solid electrolytic capacitor according to claim 6, wherein said intermediate layer has a thickness of a monomolecular layer.

8. The solid electrolytic capacitor according to claim 1, wherein said intermediate layer contains MPTMS.

9. The solid electrolytic capacitor according to claim 8, wherein said intermediate layer has a thickness of a monomolecular layer.

10. A method of manufacturing a solid electrolytic capacitor, comprising steps of:
    forming a dielectric layer containing an oxide of metal on an anode containing said metal;
    forming an electrolyte layer containing manganese oxide or conductive polymer on said dielectric layer;
    forming an intermediate layer of organic silane on said electrolyte layer by immersing said electrolyte layer in an aqueous solution containing said organic silane;
    forming a first conductive layer containing carbon particles on said intermediate layer; and
    forming a second conductive layer containing silver particles on said first conductive layer,
    wherein said intermediate layer is thinner than said first conductive layer.

11. The method of manufacturing the solid electrolytic capacitor according to claim 10, wherein said aqueous solution includes at least one kind of said organic silane selected from the group consisting of aminopropyltriethoxysilane (APTES), dimethoxydiphenylsilane (DMDPS) and mercaptopropyltrimethoxysilane (MPTMS).

12. The method of manufacturing the solid electrolytic capacitor according to claim 10, wherein said aqueous solution contains APTES.

13. The method of manufacturing the solid electrolytic capacitor according to claim 10, wherein said aqueous solution contains DMDPS.

14. The method of manufacturing the solid electrolytic capacitor according to claim 10, wherein said aqueous solution contains MPTMS.

* * * * *